United States Patent
Kryscinski et al.

(10) Patent No.: US 12,050,855 B2
(45) Date of Patent: Jul. 30, 2024

(54) SYSTEMS AND METHODS FOR QUERY-FOCUSED SUMMARIZATION

(71) Applicant: Salesforce, Inc., San Francisco, CA (US)

(72) Inventors: Wojciech Kryscinski, Palo Alto, CA (US); Alexander R. Fabbri, New York, NY (US); Jesse Vig, Los Altos, CA (US)

(73) Assignee: Salesforce, Inc., San Francisco, CA (US)

( * ) Notice: Subject to any disclaimer, the term of this patent is extended or adjusted under 35 U.S.C. 154(b) by 141 days.

(21) Appl. No.: 17/749,837

(22) Filed: May 20, 2022

(65) Prior Publication Data

US 2022/0277135 A1 Sep. 1, 2022

Related U.S. Application Data

(60) Provisional application No. 63/289,471, filed on Dec. 14, 2021.

(51) Int. Cl.
| | |
|---|---|
| *G06F 16/00* | (2019.01) |
| *G06F 16/332* | (2019.01) |
| *G06F 16/34* | (2019.01) |
| *G06F 40/166* | (2020.01) |

(52) U.S. Cl.
CPC ........ *G06F 40/166* (2020.01); *G06F 16/3329* (2019.01); *G06F 16/345* (2019.01)

(58) Field of Classification Search
None
See application file for complete search history.

(56) References Cited

U.S. PATENT DOCUMENTS

| | | | | |
|---|---|---|---|---|
| 7,451,395 B2 * | 11/2008 | Brants | ................... | G06F 40/131 715/255 |
| 11,727,935 B2 * | 8/2023 | Malladi | ................. | G06F 40/258 704/231 |
| 2023/0054726 A1 * | 2/2023 | Roy | ........................ | G06F 16/35 |

OTHER PUBLICATIONS

Egonmwan et al., "Transformer-based Model for Single Documents Neural Summarization," WNGT 2019, Nov. 2019, pp. 70-79. (Year: 2019).*
T. Kimura, R. Tagami and H. Miyamori, "Query-Focused Summarization Enhanced with Sentence Attention Mechanism," 2019 IEEE International Conference on Big Data and Smart Computing (BigComp), Kyoto, Japan, 2019, pp. 1-8. (Year: 2019).*
Beltagy, I., et al., "Longformer: The Long-Document Transformer," Apr. 2020, pp. 17.
Chen, T., et al., "Training deep nets with sublinear memory cost," Machine Learning, Apr. 2016, pp. 12.
(Continued)

*Primary Examiner* — Amelia L Tapp
(74) *Attorney, Agent, or Firm* — Haynes and Boone, LLP

(57) ABSTRACT

Embodiments described herein provide a query-focused summarization model that employs a single or dual encoder model. A two-step approach may be adopted that first extracts parts of the source document and then synthesizes the extracted segments into a final summary. In another embodiment, an end-to-end approach may be adopted that splits the source document into overlapping segments, and then concatenates encodings into a single embedding sequence for the decoder to output a summary.

20 Claims, 10 Drawing Sheets

(56) References Cited

OTHER PUBLICATIONS

Fabbri, A.R, et al., "AnswerSumm: A Manually-Curated Dataset and Pipeline for Answer Summarization," Proceedings of the 2022 Conference of the North American Chapter of the Association for Computational Linguistics: Human Language Technologies, Jul. 2022, pp. 2508-2520.
Izacard, G., et al. "Leveraging Passage Retrieval with Generative Models for Open Domain Question Answering," Proceedings of the 16th Conference of the European Chapter of the Association for Computational Linguistics, Apr. 19-23, 2021, pp. 874-880.
Lin, C-Y., "Rouge: A Package for Automatic Evaluation of summaries," Conference: In Proceedings of the Workshop on Text Summarization Branches Out, Jul. 2004, pp. 71-81.
Nallapati et al., "Abstractive Text Summarization using Sequence-to-sequence RNNs and Beyond," The SIGNLL Conference on Computational Natural Language Learning. Berlin, Germany. Aug. 11-12, 2016. pp. 1-12.
Reimers et al., "Sentencebert: Sentence embeddings using siamese bertnetworks," arXiv preprint arXiv:1908.10084, 2019.
Zhong, M., et al., "QMSum: A New Benchmark for Query-based Multi-domain Meeting Summarization," Proceedings of the 2021 Conference of the North American Chapter of the Association for Computational Linguistics: Human Language Technologies, Jun. 6-11, 2021, pp. 5905-5921.

\* cited by examiner

| Model | Lexical Overlap b/w Extractors and References | | | | | | | | | | | | | | | | Span Overlap b/w Extractors and Golden Spans | |
|---|---|---|---|---|---|---|---|---|---|---|---|---|---|---|---|---|---|---|
| | Top-1 | | | | Top-5 | | | | Top-15 | | | | All | | | | All | |
| | R-1 | R-2 | R-L | τ | R-1 | R-2 | R-L | τ | R-1 | R-2 | R-L | τ | R-1 | R-2 | R-L | τ | Precision | Recall |
| Gold Spans | 15.00 | 3.80 | 11.10 | 60 | 20.89 | 6.05 | 15.04 | 218 | 19.62 | 5.99 | 14.28 | 386 | 16.09 | 5.60 | 12.47 | 660 | 0.75 | 1.00 |
| Lead | 8.17 | 0.98 | 6.30 | 92 | 12.84 | 1.69 | 9.17 | 309 | 13.13 | 1.81 | 9.21 | 463 | 8.77 | 1.79 | 6.77 | 978 | 0.09 | 0.20 |
| DPR | 11.31 | 1.99 | 8.72 | 34 | 17.46 | 2.86 | 12.21 | 156 | 15.38 | 2.74 | 10.64 | 394 | 9.75 | 2.23 | 7.42 | 932 | 0.22 | 0.27 |
| RelRegTT | 23.67 | 3.34 | 15.66 | 82 | 16.13 | 3.35 | 11.18 | 413 | 9.65 | 2.58 | 7.31 | 930 | 9.16 | 2.52 | 6.99 | 994 | 0.07 | 0.24 |
| Marge | 7.13 | 0.72 | 5.81 | 20 | 13.76 | 1.30 | 10.22 | 92 | 14.85 | 1.74 | 11.09 | 269 | 9.21 | 1.52 | 7.16 | 896 | 0.15 | 0.21 |
| RelReg | 24.57 | 4.33 | 16.57 | 88 | 17.52 | 4.11 | 12.21 | 418 | 10.56 | 3.04 | 8.06 | 884 | 9.62 | 2.87 | 7.47 | 989 | 0.11 | 0.28 |

*FIG. 6*

| Model | R-1 | R-2 | R-L |
|---|---|---|---|
| DPR | 32.79 | 9.82 | 28.91 |
| RelRegTT | 32.65 | 9.00 | 28.57 |
| Marge | 31.90 | 9.10 | 28.17 |
| RelReg | 33.43 | 9.77 | 29.40 |
| RelReg (256) | 34.67 | 11.53 | 30.66 |
| RelReg (512) | 32.22 | 10.29 | 29.49 |

*FIG. 7*

| Model | Input | Attn | R-1 | R-2 | R-L |
|---|---|---|---|---|---|
| BART | 1024 | 1024 | 32.42 | 9.62 | 28.37 |
| LED | 4096 | 256 | 31.55 | 8.89 | 27.62 |
| | | 512 | 32.25 | 9.27 | 28.29 |
| | | 1024 | 32.16 | 9.05 | 28.27 |
| | 8192 | 256 | 31.79 | 8.97 | 27.75 |
| | | 512 | 32.76 | 9.38 | 28.65 |
| | | 1024 | 32.85 | 9.26 | 28.73 |
| | 16384 | 256 | 31.94 | 9.16 | 27.73 |
| | | 512 | 32.88 | 9.82 | 28.90 |
| | | 1024 | 32.98 | 9.60 | 29.08 |
| SegEnc | 4096 | 256 | 35.35 | 10.37 | 30.91 |
| | | 512 | 35.25 | 10.36 | 30.85 |
| | | 1024 | 34.36 | 9.85 | 30.13 |
| | 8192 | 256 | 36.51 | 11.36 | 31.87 |
| | | 512 | 36.68 | 11.71 | 32.08 |
| | | 1024 | 35.48 | 10.97 | 31.21 |
| | 16384 | 256 | 37.21 | 12.14 | 32.67 |
| | | 512 | 37.47 | 12.47 | 32.95 |
| | | 1024 | 36.30 | 11.71 | 32.01 |
| SegEnc-D | 16384 | 512 | 36.68 | 11.97 | 32.35 |

*FIG. 8*

| Model | R-1 | R-2 | R-L |
|---|---|---|---|
| No Transfer | 34.42 | 9.62 | 28.37 |
| AnswerSumm | 34.36 | 9.64 | 30.22 |
| AQuaMuse | 34.57 | 9.78 | 30.42 |
| WikiHowQA | 33.08 | 9.03 | 28.48 |
| CNNDM | 33.87 | 9.36 | 28.48 |
| WikiSum | 34.73 | 9.80 | 30.54 |

*FIG. 9*

| Model | R-1 | R-2 | R-L |
|---|---|---|---|
| Baselines | | | |
| DYLE | 34.42 | 9.71 | 30.10 |
| SUMM$^N$ | 34.03 | 9.28 | 29.48 |
| BART | 31.87 | 9.08 | 27.50 |
| BART-W | 32.68 | 8.97 | 28.74 |
| BART-W (Gold) | 39.54 | 15.65 | 35.17 |
| Two-stage | | | |
| DPR | 32.28 | 9.73 | 28.34 |
| RELREGTT | 33.02 | 10.17 | 28.90 |
| MARGE | 31.99 | 8.97 | 27.93 |
| RELREG | 34.91 | 11.91 | 30.73 |
| RELREG-W | 36.45 | 12.81 | 32.28 |
| End-to-end | | | |
| LED | 34.18 | 10.32 | 29.95 |
| SEGENC | 37.05 | 13.03 | 32.62 |
| SEGENC-W | 37.80 | 13.43 | 33.38 |

*FIG. 10*

SYSTEMS AND METHODS FOR QUERY-FOCUSED SUMMARIZATION

CROSS REFERENCES

The present disclosure is a nonprovisional of and claims priority under 35 U.S.C. 119 to U.S. provisional application No. 63/289,471, filed on Dec. 14, 2021, which is hereby expressly incorporated by reference herein in its entirety.

TECHNICAL FIELD

The present disclosure relates generally to machine learning models and natural language processing, and more specifically, to systems and methods for query-focused summarization.

BACKGROUND

Query-focused summarization (QFS) is a subtask within text summarization that focuses on generating summaries where the summary content is tailored to a user-specified query that is passed alongside the source document as input to the model. For example, given a Wikipedia article on "World War II" and a query "what are the countries involved in World War II," a QFS model outputs a summary of the article that provides information on the countries involved in World War II. Existing QFS models may adopt an extractor model which extracts parts of the source document relevant to the input query, and an abstractor model, which synthesizes the extracted segments into a final summary.

There is a need for a more efficient QFS mechanism.

BRIEF DESCRIPTION OF THE DRAWINGS

FIGS. 6-10 provide various data plots illustrating example performance of the QFS models in data experiments.

Figure 1A:
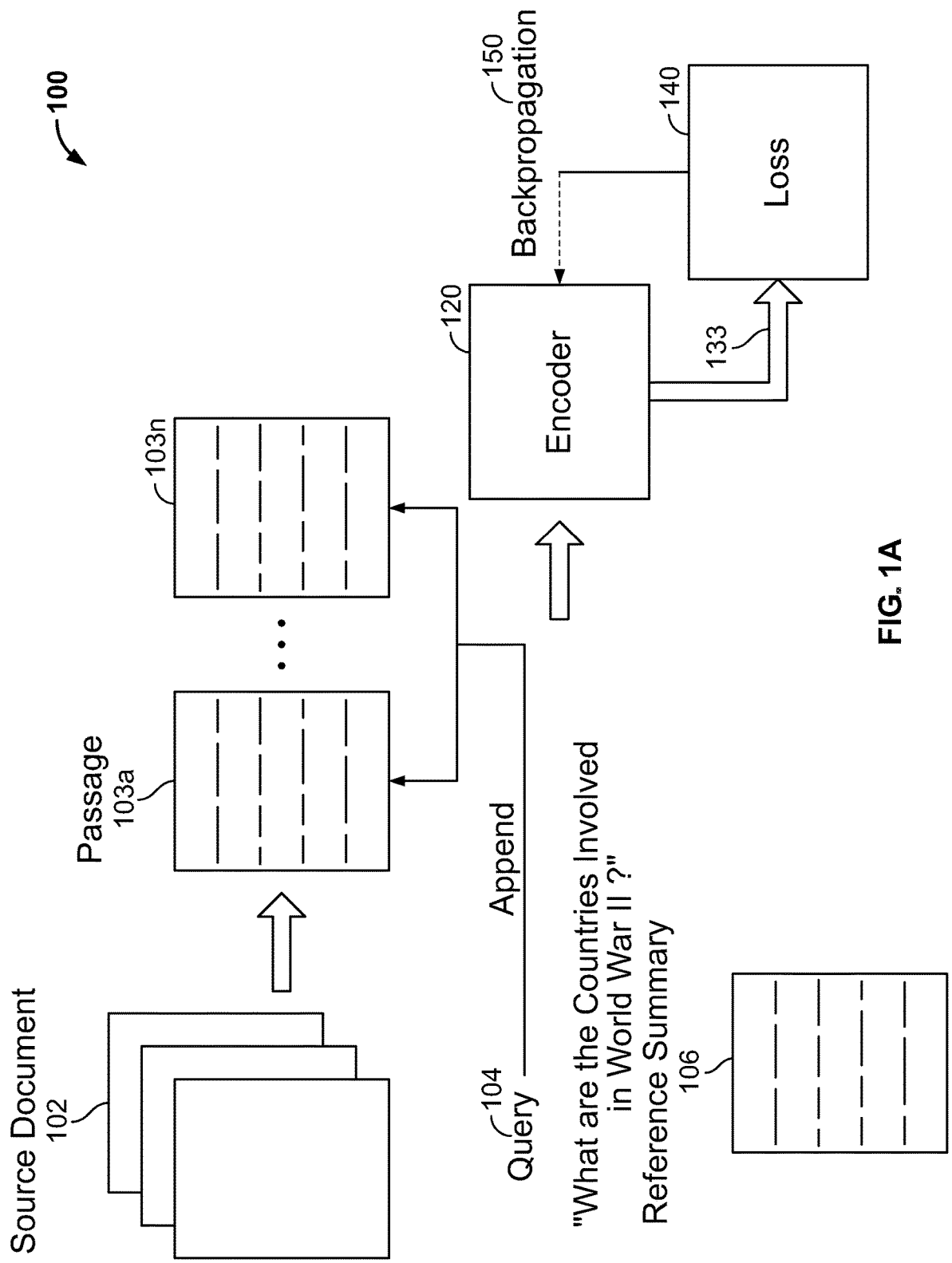
FIGS. 1A-1B are simplified block diagrams illustrating an encoder-decoder QFS model for implementing a two-step approach, according to embodiments described herein.

In the figures, elements having the same designations have the same or similar functions.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Query-focused summarization (QFS) is configured to produce summaries that answer particular questions of interest, enabling greater user control and personalization. Each source document can be associated with multiple unique queries inquiring about different information from that document. In this setting, end users are enabled to explicitly specify their preferences for the summary, and the relevance of the output summary may be evaluated more precisely with respect to the input query.

Embodiments described herein provide a two-step QFS model, which includes an extractor model to extract parts of the source document relevant to the input query, and an abstractor model to synthesize the extracted segments into a final summary. Specifically, a relevance model is trained directly on QFS data using the original non-masked query. This model is trained to predict the proxy for relevance (ROUGE) overlap between a given passage and the reference summary, using only the passage and query as input. Therefore, the relevance model can be used as a score-and-rank extractor model, which first score each source passage for relevance to the query and then rank the passages in descending order of relevance, with the concatenated and truncated results passed to the abstractor for synthesizing the final summary.

In one embodiment, single encoder models may be used to concatenate a query and source passage as input to the scoring function that produces the similarity score. A single-encoder model jointly encodes the delimiter separated query and passage, and the final layer of the model outputs the predicted relevance value.

In one embodiment, a dual-encoder model may be used to separately encode a query and source passage before calculating the cosine similarity between the embeddings to compute the relevance score. Specifically, a relevance regression two-tower model that uses a dual-encoder architecture to predict ROUGE-based relevance scores. A shared-parameter encoder may be used for each of the query and passage and a special token is appended to each input that identifies either query or passage. The final output for the model is based on the inner product of the pooled embeddings for the query and passage.

Embodiments further provide an end-to-end encoder-decoder QFS model. For example, a two-step pipeline often depends on the strength of the retrieval component and may fail to capture all relevant content despite an ideal retriever, due to length limitations of the generation component. An end-to-end segment encoder model may be adopted. The source document is split into fixed-length overlapping1 segments, each of which is separately appended to the query and encoded using a standard Transformer model. These encodings are then concatenated into a single embedding sequence and passed to a decoder model that generates the summary. Since there is no cross-attention between the encoded segments, the attention mechanism scales linearly in the number of segments and hence the length of the source document. Nonetheless, the decoder can attend to all encoded segments jointly, enabling the encoder-decoder architecture to operate in an end-to-end fashion.

Figure 1B:
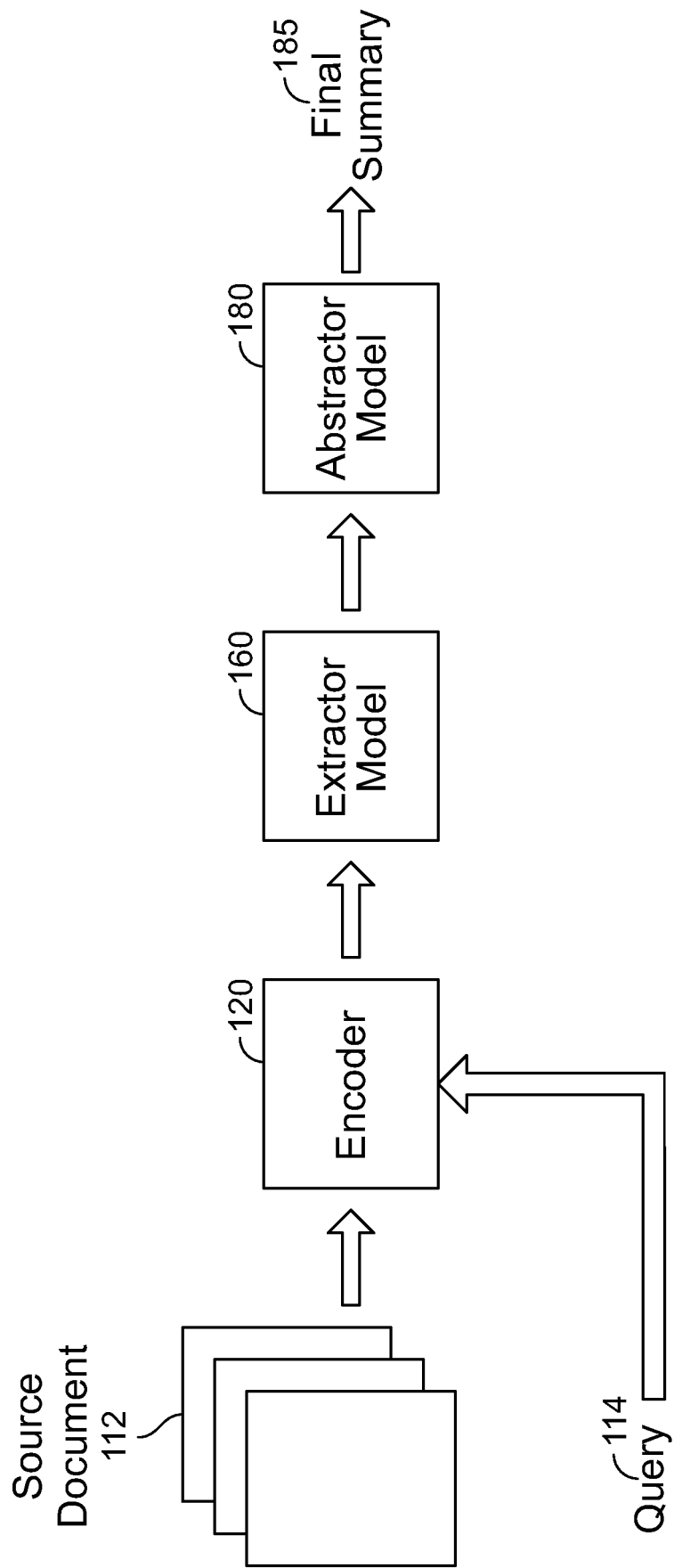

FIGS. 1A-1B are simplified block diagrams illustrating an encoder-decoder QFS model for implementing a two-step approach, according to embodiments described herein. FIG. 1A shows an example structure 100 that trains a relevance prediction model that comprises an encoder 120 directly on QFS data using the original, non-masked query. For example, a source document 102 may be divided into a number of passages 103a-n. Each passage 103a-n is then appended with the query 104 (e.g., "what are the countries involved in World War II?"), separated by a delimiter. The encoder model 120 may jointly encode the delimiter-separated query and passage into a respective encoding.

The encoder model 120 may also receive a reference summary 106 of the source document 102 according to the query 104. The final layer of the encoder model 120 may output a predicted relevance value 133 reflecting the ROUGE overlap between each respective source passage 103a-n and the reference summary 106 based on the jointly encoded passage and query.

In one embodiment, the encoder model 120 is a single encoder model that concatenates a query 104 and a source passage 103a-n as input to the scoring function that produces the similarity score (e.g., the relevance value 133). Those models benefit from full cross-attention between query 104 and passage 103a-n, resulting in richer data representations.

In another embodiment, the encoder model 120 may be a dual-encoder model that separately encodes a query 104 and each source passage 103a-n. The dual encoder may then calculate a cosine similarity between the query embedding and the passage embedding to compute the relevance score 133. This class of models offers computational benefits, as passage embeddings may be precomputed and stored for a given input, while the single-encoder model must be run over all passages should a new query be introduced. In one implementation, the dual-encoder model may be implemented with a backbone architecture of Sentence-BERT (described in Reimers et al., Sentence-BERT: Sentence Embeddings using Siamese BERT-Networks, in Proceedings of the 2019 Conference on Empirical Methods in Natural Language Processing and the 9th International Joint Conference on Natural Language Processing (EMNLP-IJCNLP), 3982-3992, 2019). The architecture may use a shared-parameter encoder for each of the query and passage and a special token is appended to each input that identifies either query or passage. The final output for the model is based on the inner product of the pooled embeddings for the query and passage.

The predicted relevance values 133 are then sent to the loss module 140 to compute a mean square error objective over a training dataset of source documents. The loss module 140 may then update the encoder model 120 via backpropagation 150.

FIG. 1B shows an example structure of the two-step QFS model that consists of an extractor model 160, which extracts parts of the source document 112 relevant to the input query 114, and an abstractor model 180, which synthesizes the extracted segments into a final summary 185. In one embodiment, a score-and-rank extractor model 160, which first score each source passage from the source document 112 based on the relevance to the query 114, generated by the trained encoder 120, and then rank the passages in descending order of relevance, with the concatenated and truncated results passed to the abstractor model 180. In one embodiment, the abstractor model 180 may be a BART-large model.

Figure 2:
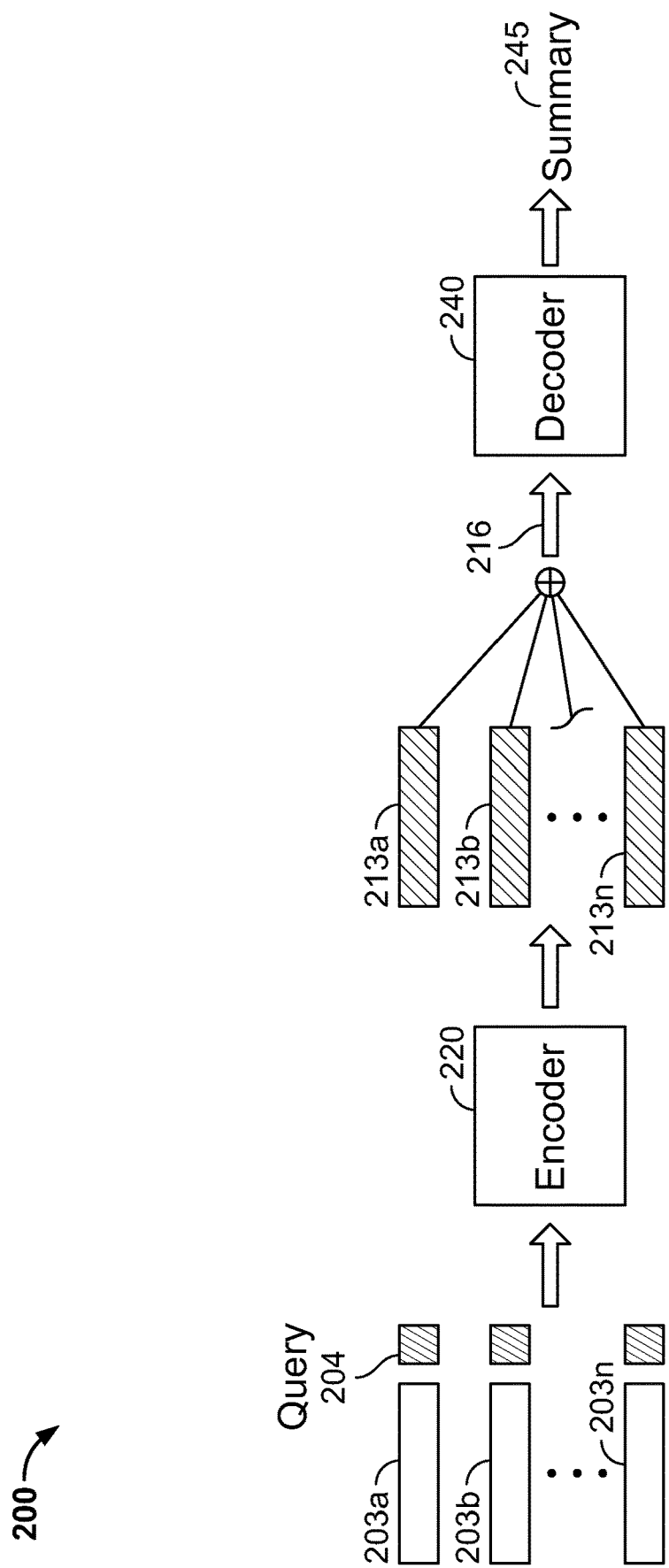
FIG. 2 is a simplified block diagram 200 illustrating an end-to-end encoder decoder QFS model for summary generation, according to embodiments described herein.

FIG. 2 is a simplified block diagram 200 illustrating an end-to-end encoder decoder QFS model for summary generation, according to embodiments described herein. Diagram 200 shows an end-to-end QFS model comprising an encoder 220 and a decoder 240.

In one embodiment, the encoder 220 may include sparse attention based solely on windowed local attention, and the decoder 240 may be implemented by the Fusion-in-decoder (FiD) described in Izacard et al., Leveraging Passage Retrieval with Generative Models for Open Domain Question Answering, Proceedings of the 16th Conference of the European Chapter of the Association for Computational Linguistics: Main Volume, 874-880, 2021, a model for open-domain question answering. The source document is split into fixed-length overlapping segments 203a-n, each of which is separately appended to the query 204 and encoded using a Transformer encoder 220. These encodings 213a-n are then concatenated into a single embedding sequence 216 and passed to a decoder 240 that generates the summary 245.

As there is no cross-attention between the encoded segments, the attention mechanism scales linearly in the number of segments and hence the length of the source document. Nonetheless, the decoder can attend to all encoded segments jointly, enabling the encoder-decoder architecture to operate in an end-to-end fashion. This model is motivated by two hypotheses: 1) query-relevant sections within a source document are often small enough to be processed by Transformer models (e.g., 1024 tokens), and 2) each query-relevant section may be understood independently of other sections, removing the need for cross-attention between the segments.

Figure 3:
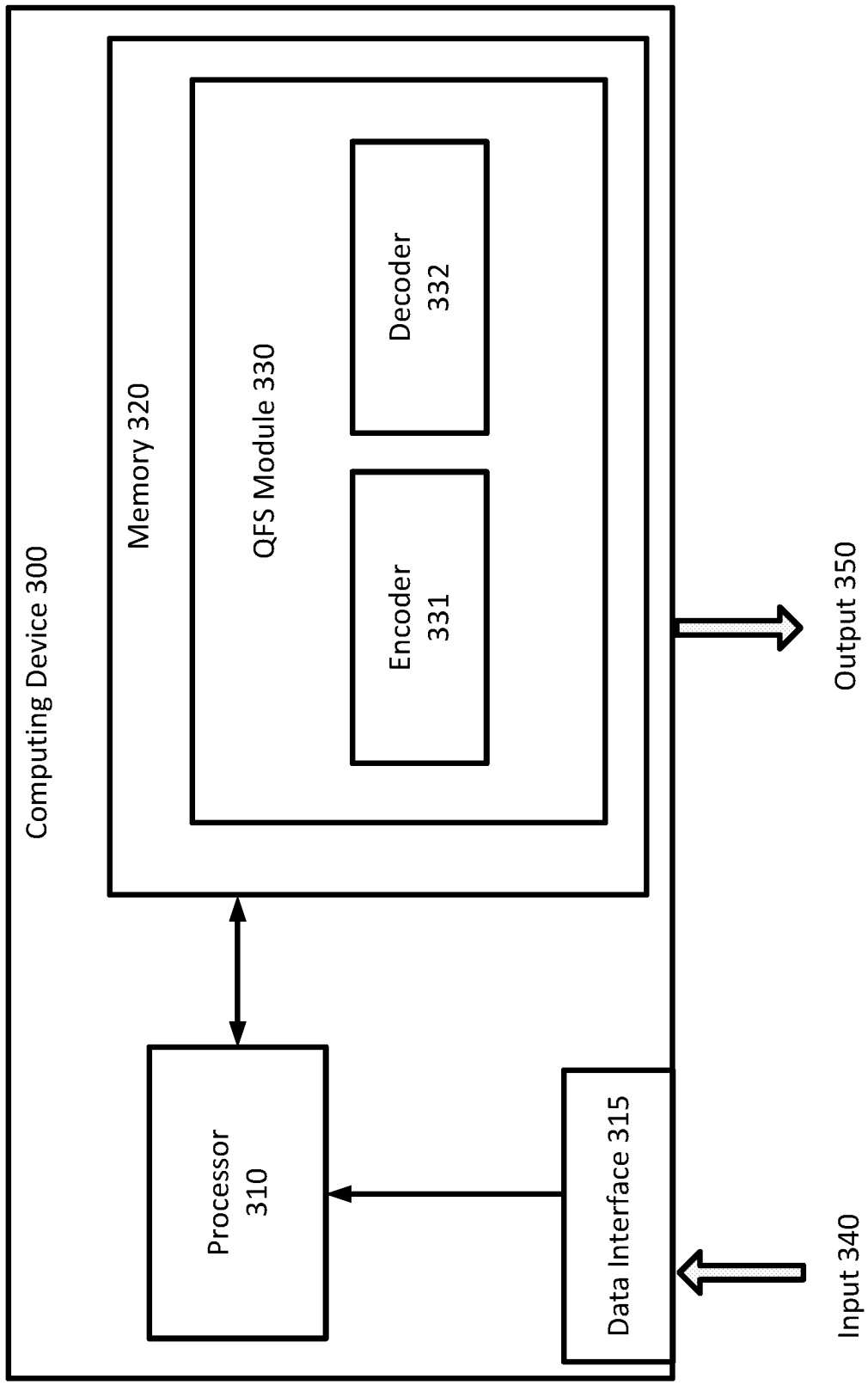
FIG. 3 is a simplified diagram of a computing device for implementing the QFS models described herein, according to some embodiments.

FIG. 3 is a simplified diagram of a computing device for implementing the QFS models described herein, according to some embodiments. As shown in FIG. 3, computing device 300 includes a processor 310 coupled to memory 320. Operation of computing device 300 is controlled by processor 310. And although computing device 300 is shown with only one processor 310, it is understood that processor 310 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 300. Computing device 300 may be implemented as a stand-alone subsystem, as a board added to a computing device, and/or as a virtual machine.

Memory 320 may be used to store software executed by computing device 300 and/or one or more data structures used during operation of computing device 300. Memory 320 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 310 and/or memory 320 may be arranged in any suitable physical arrangement. In some embodiments, processor 310 and/or memory 320 may be implemented on a same board, in a same package (e.g., system-in-package), on a same chip (e.g., system-on-chip), and/or the like. In some embodiments, processor 310 and/or memory 320 may include distributed, virtualized, and/or containerized computing resources. Consistent with such embodiments, processor 310 and/or memory 320 may be located in one or more data centers and/or cloud computing facilities.

In some examples, memory 320 may include non-transitory, tangible, machine readable media that includes executable code that when run by one or more processors (e.g., processor 310) may cause the one or more processors to perform the methods described in further detail herein. For example, as shown, memory 320 includes instructions for a QFS module 330 that may be used to implement and/or emulate the systems and models, and/or to implement any of the methods described further herein. In some examples, the QFS module 330, may receive an input 340, e.g., such as a query and a source document via a data interface 315. The QFS module 330 may generate an output 350 (such as a summary) in response to the input 340. In some examples, the QFS module 330 comprising an encoder 331 and a decoder 332 may be implemented using hardware, software, and/or a combination of hardware and software.

Some examples of computing devices, such as computing device 300 may include non-transitory, tangible, machine readable media that include executable code that when run by one or more processors (e.g., processor 310) may cause the one or more processors to perform the processes of method. Some common forms of machine readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 4A:
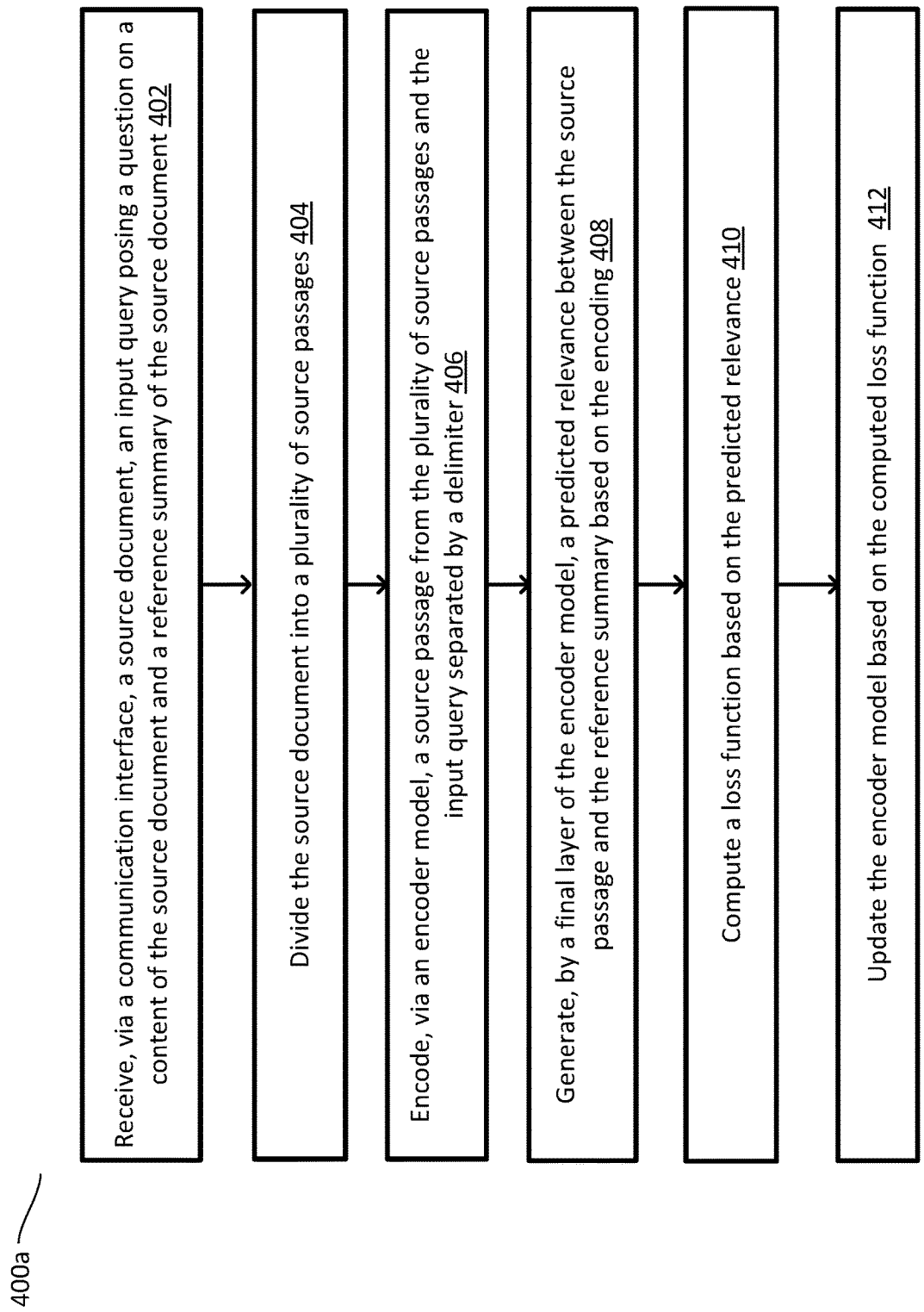
FIG. 4A provides a simplified logic flow diagram illustrating a method of training a QFS model for a two-step approach, according to some embodiments described herein.

FIG. 4A provides a simplified logic flow diagram illustrating a method of training a QFS model for a two-step approach, according to some embodiments described herein. One or more of the processes of method 400a may be implemented, at least in part, in the form of executable code stored on non-transitory, tangible, machine-readable media that when run by one or more processors may cause the one or more processors to perform one or more of the processes. In some embodiments, method 400a corresponds to the operation of the QFS 330 (FIG. 3) to perform query-focused summarization.

At step 402, a source document (e.g., 102 in FIG. 1A), an input query (e.g., 104 in FIG. 1A) posing a question on a content of the source document and a reference summary (e.g., 106 in FIG. 1) of the source document may be received, via a communication interface (e.g., 315 in FIG. 3).

At step 404, the source document (e.g., 102 in FIG. 1A) is divided into a plurality of source passages (e.g., 103a-n in FIG. 1A).

At step 406, a source passage from the plurality of source passages and the input query separated by a delimiter may be encoded via an encoder model (e.g., 120 in FIG. 1A).

At step 408, the final layer of the encoder model (e.g., 120 in FIG. 1A) may generate a predicted relevance between the source passage and the reference summary based on the encoding. For example, a predicted relevance value is generated reflecting the overlap between each respective source passage and the reference summary for training.

At step 410, a loss function may be computed based on the predicted relevance.

At step 412, the encoder model may be updated based on the computed loss function.

Figure 4B:
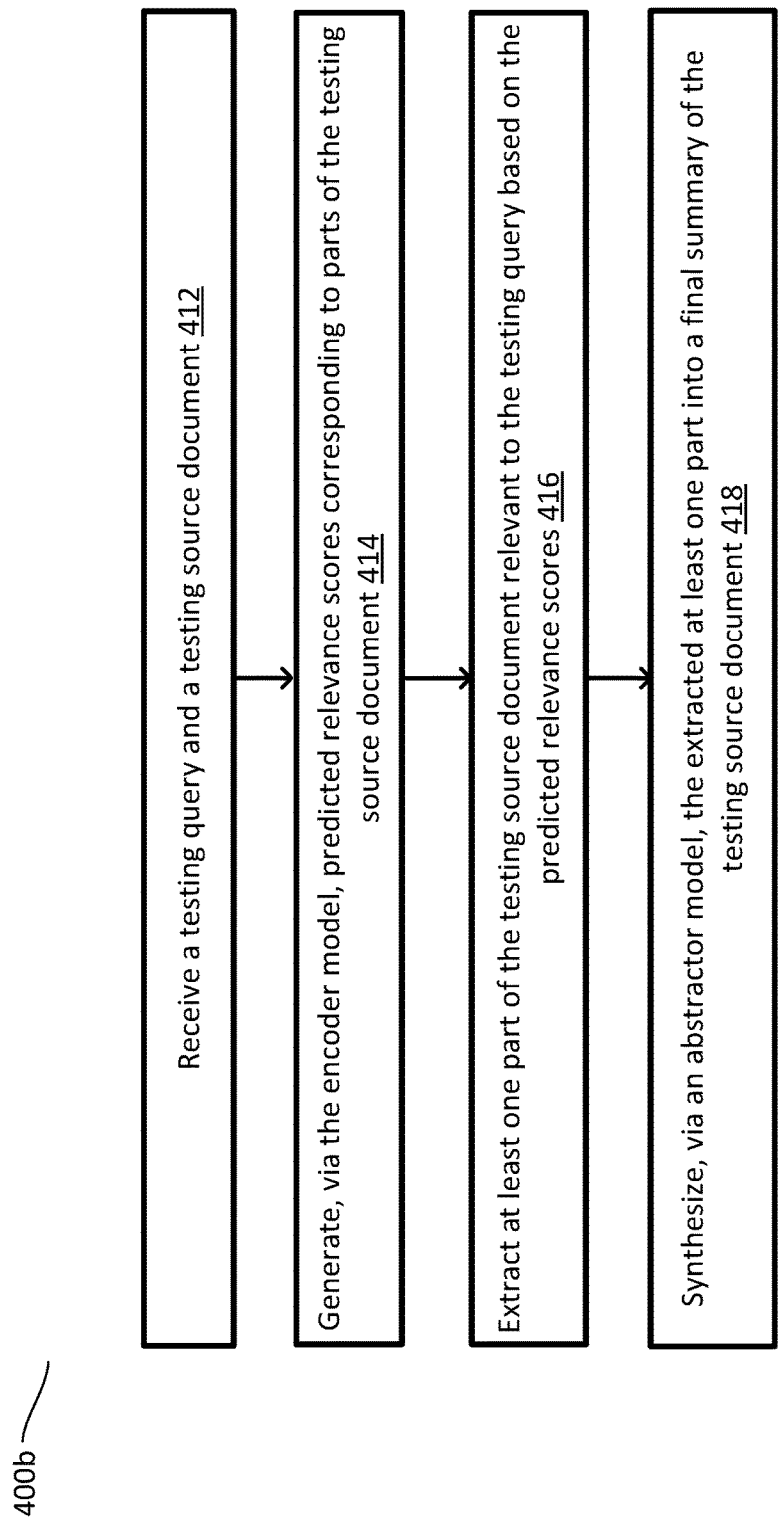
FIG. 4B provides a simplified logic flow diagram illustrating a method of using a trained relevance prediction model for a two-step approach, according to some embodiments described herein.

FIG. 4B provides a simplified logic flow diagram illustrating a method of using a trained relevance prediction model for a two-step approach, according to some embodiments described herein. One or more of the processes of method 400b may be implemented, at least in part, in the form of executable code stored on non-transitory, tangible, machine-readable media that when run by one or more processors may cause the one or more processors to perform one or more of the processes. In some embodiments, method 400b corresponds to the operation of the QFS 330 (FIG. 3) to perform query-focused summarization.

At step 412, a testing query (e.g., 114 in FIG. 1B) and a testing source document (e.g., 112 in FIG. 1B) may be received.

At step 414, the encoder model (e.g., 120 in FIG. 1B) may generate predicted relevance scores corresponding to parts of the testing source document.

At step 416, an extractor model (e.g., 160 in FIG. 1B) may extract at least one part of the testing source document relevant to the testing query based on the predicted relevance scores.

At step 418, an abstractor model (e.g., 180 in FIG. 1B) may synthesize the extracted at least one part into a final summary of the testing source document.

Figure 5:
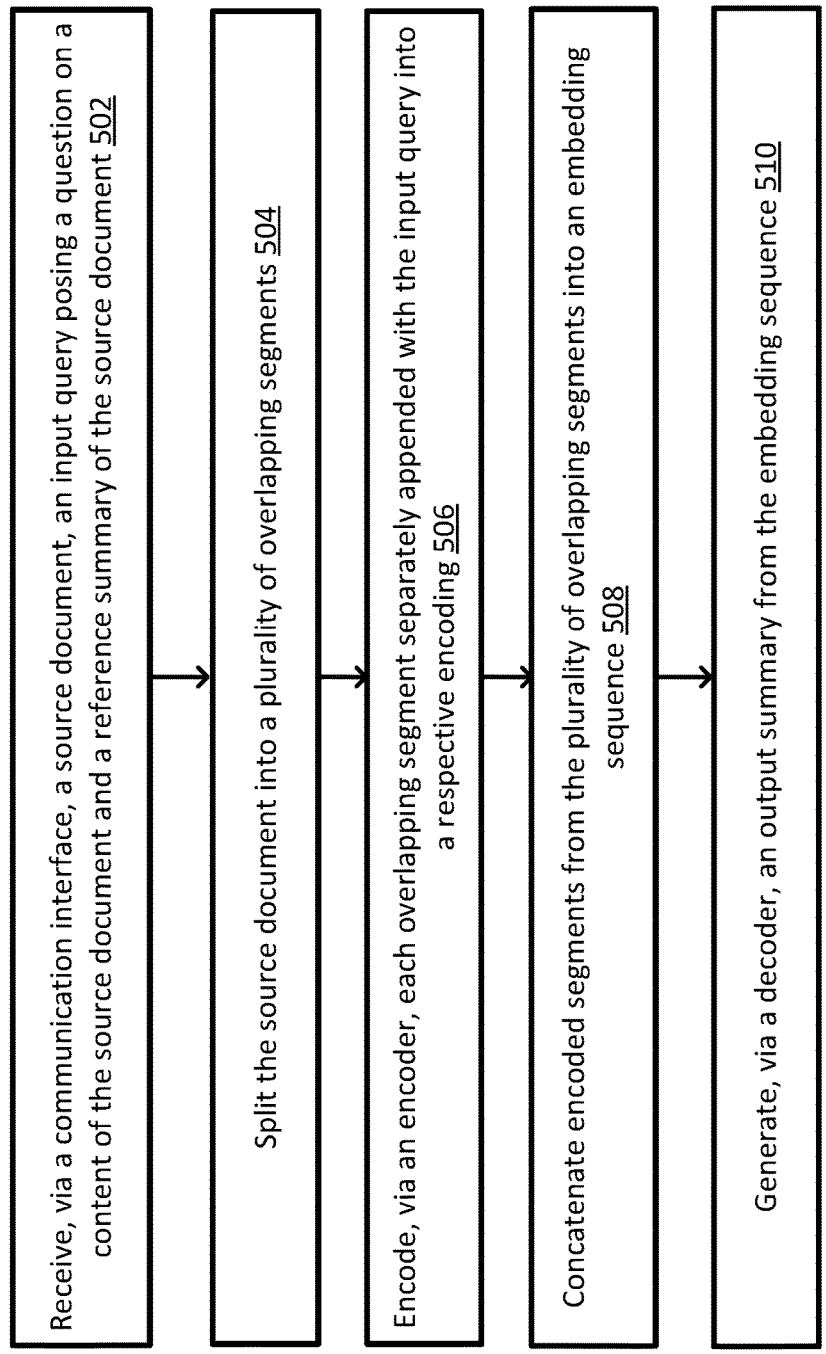
FIG. 5 provides a simplified logic flow diagram illustrating a method of an end-to-end QFS approach, according to some embodiments described herein.

FIG. 5 provides a simplified logic flow diagram illustrating a method of an end-to-end QFS approach, according to some embodiments described herein. One or more of the processes of method 500 may be implemented, at least in part, in the form of executable code stored on non-transitory, tangible, machine-readable media that when run by one or more processors may cause the one or more processors to perform one or more of the processes. In some embodiments, method 500 corresponds to the operation of the QFS 330 (FIG. 3) to perform query-focused summarization.

At step 502, a source document (e.g., 102 in FIG. 1A), an input query (e.g., 104 in FIG. 1A) posing a question on a content of the source document and a reference summary (e.g., 106 in FIG. 1) of the source document may be received, via a communication interface (e.g., 315 in FIG. 3).

At step 504, the source document (e.g., 102 in FIG. 1A) may be split into a plurality of overlapping segments (e.g., 203a-n in FIG. 2).

At step 506, an encoder (e.g., 220 in FIG. 2) may encode each overlapping segment separately appended with the input query into a respective encoding.

At step 508, encoded segments from the plurality of overlapping segments are concatenated into an embedding sequence (e.g., 216 in FIG. 2).

At step 510, a decoder (e.g., 240 in FIG. 2) may generate an output summary (e.g., 245 in FIG. 2) from the embedding sequence (e.g., 216 in FIG. 2).

FIGS. 6-10 provide various data plots illustrating example performance of the QFS models in data experiments. Data for the data experiments includes QMSum (Zhong et al., QMSum: A New Benchmark for Query-based Multi-domain Meeting Summarization, Proceedings of the 2021 Conference of the North American Chapter of the Association for Computational Linguistics: Human Language Technologies, 5905-5921, 2021) which is a query-focused dialogue summarization dataset consisting of 1,808 query-summary pairs over 232 meetings from product design, academic, and political committee meetings, all conducted in English. QMSum also includes additional annotations such as topic segmentations and highlighted text spans associated with reference summaries. The provided span annotations are used to run oracle experiment.

In the data experiments, models were implemented using the PyTorch and Hugging-face libraries. Model weights were initialized from pre-trained checkpoints available through the Huggingface Model Hub. Models were trained for 10 epochs with final checkpoints selected based on the average of ROUGE-$\{1, 2, L\}$(R-1, R-2, R-L) scores achieved on the validation set. Gradient checkpointing (Chen et al., Training deep nets with sublinear memory cost, arXiv:1604.06174v2, 2016) was used for the LED and SEGENC models to reduce the memory footprint. Model outputs were decoded using beam search with 4 beams. To ensure high consistency of results, all experiments were repeated 5 times with results averaged across runs.

Models were evaluated using the ROUGE-{1, 2, L}metrics (Lin, ROUGE: A Package for Automatic Evaluation of Summaries, Text Summarization Branches Out, Association for Computational Linguistics, 74-81, 2004) included in the SummEval toolkit (Fabbri et al., 2021). Model Hyperparameters Model-specific settings were chosen through a hyperparameter search with candidate models compared on the validation For two-stage models, the data experiments first focus on evaluating the extractor component and comparing performance to baseline heuristics. Extractor performance is quantified using two metrics: 1) lexical overlap between the extracted utterances and reference summaries, computed using R-1, R-2, and R-L metrics, 2) span overlap between the extracted and golden spans included with QMSum represented by Precision and Recall scores, with results shown in FIG. 6. In both cases, FIG. 6 first orders utterances of the conversation according to the scores assigned by the extractor models, then concatenate the utterances and finally truncate the result to 1024 tokens (excluding the space reserved for the query) to mimic the input length limits of downstream abstractor models; we present those numbers as all columns in FIG. 6. For the lexical overlap, the scores for the best 1 (Top-1), 5 (Top-5), and 15 (Top-15) utterances are shown. The results show that the best-performing model is the proposed two-step model shown in FIGS. 1A-1B (denoted as "RELREG") closely followed by RELREGTT (using a dual-encoder) in the Top-1 evaluation and DPR in the Top-5, Top-15 and all cases.

It is noted that both the RELREG and RELREGTT models tend to select longer utterances than the other extractors; the regression-based training mirrors the ROUGE overlap score which favors longer, more informative utterances. However, despite their strong performance in extracting top-matching utterances, the results also expose a considerable gap between model-based approaches and human annotations when considering the entirety of extracted spans.

It is further noticed that despite the simplicity of the LEAD heuristic, which extracts the first k utterances in their original order, it remains competitive with the data-driven extractor models when we consider the All case.

For the best-performing model, the effect of varying the input segment size used during training and inference between 256 and 512 tokens. Validation-set results for all models are reported in FIG. 7. It is observed that DPR slightly outperforms RELREGTT for dual-encoder models. Among single-encoder models, RELREG outperforms MARGE by over a full R-1 point, which may be explained by RELREG using more direct supervision based on an in-domain query, rather than creating synthetic queries from an external dataset using masking.

The single-encoder RELREG outperforms the best dual-encoder model; the cross-attention term in the single-encoder RELREG model allows it to better attend to the query when determining relevance. Intuitively, the ordering of results corresponds to the span overlap recall with the gold spans; the ability of the extractor to select produce high-recall rankings directly affects abstractor performance. Increasing the input segment length used in training and inference for RELREG improves at 256 tokens but decreases at 512 tokens, suggesting that a balance is found between including additional context for ranking versus enabling a greater number of shorter segments that may capture more diverse content from the source.

The data experiments further explore hyperparameter choices for two end-to-end architectures: the Long-former Encoder-Decoder (LED) described in Belgagy et al., Long-former: The Long-Document Transformer, arXiv: 2004.05150, 2020, and Segment Encoder (SEGENC) as described in FIG. 2. For both models, different choices for input size (4096, 8192, or 16384 tokens) and attention window size3 (256, 512, or 1024 tokens). For SEGENC, two different segmentation strategies are considered: overlapping segments (50% overlap) and disjoint segments. Validation set results for both models and a baseline BART model are reported in FIG. 8.

It is observed that both the LED and SEGENC benefit from increasing the input size and perform best with the input limit set to 16,384 tokens. The optimal attention window for LED is 1024, while SEGENC performs best with an attention window of 512 tokens. For SEGENC, using overlapping segments improves performance compared to using disjoint segments, suggesting that the additional context provided by the former approach is helpful for locating relevant content. The SEGENC model achieves the highest performance out of the end-to-end architectures with ROUGE scores of 37.47 R-1, 12.47 R-2, and 32.95 R-L on the validation set.

The results also highlight that while the LED model matches or slightly outperforms the BART baseline for higher maximum input and window sizes, it performs substantially worse than SEGENC. One possible explanation for the lower performance of LED relative to SEGENC is that LED must adapt its parameters for a global attention mechanism that is absent from the back-bone BART encoder model, whereas SEGENC relies solely on local self-attention that is aligned with the backbone model. This may be particularly relevant to QMSum given its relatively small size.

Computational complexity increases with both input length and attention window size (since attention grows quadratically in attention-window size). Complexity is also greater with the overlapping segment strategy compared to the disjoint segment strategy for the SEGENC model, due to the greater number of resulting segments that are passed through the encoder and decoder modules.

Having determined the best-performing models, the experiments examine whether performance can be further improved by fine-tuning a model that has already been fine-tuned for a different summarization task. The end-to-end BART is used on 1024 tokens, as this model is the backbone, albeit in varying ways, of both the two-step and end-to-end models. Transferring capabilities of models trained on the news summarization task from CNN/Daily-Mail (Nallapati et al., Abstractive Text Summarization Using Sequence-to-Sequence RNNs and Beyond, arXiv: 1602.06023, 2016) are tested as well as the previously-mentioned query- and topic-focused summarization tasks: AnswerSumm, AQuaMuSe, WikiHowQA, and WikiSum. which is compared to fine-tuning from the original BART checkpoint, with results shown in FIG. 9.

It is observed that transferring from any of the tasks improves over no transfer in R-1 and R-L. Transferring from any of the constrained, query-focused tasks outperforms transferring from unconstrained news summarization. Furthermore, transferring from WikiSum outperforms transfer from other datasets, which aligns with other work that shows the generalizability of Wikipedia as a source of data for task transfer (Fabbri et al., AnswerSumm: A Manually-Curated Dataset and Pipeline for Answer Summarization, arXiv: 2111.06474, 2021). The test set performance of the best-performing architectures are presented in FIG. 10 along with baseline models.

It is observed that RELREG and SEGENC outperform existing state-of-the-art models by a substantial margin, and that initializing the model from the Wikisum-fine-tuned checkpoint further improves performance, with the best model exceeding current state-of-the-art performance by a difference of 3.38 R-1, 3.72 R-2, and 3.28 R-L. Comparing the best models from each category, it is observed that the end-to-end approach outperforms the two-stage. Within the two-stage dual-encoder models, RELREGTT outperforms DPR on the test set despite the slightly worse performance on the validation set. This variation to the small size of the validation set, and our other findings remain consistent across validation and test sets. The single-encoder RELREG outperforms the best dual-encoder model, with RELREG-W improving upon the current state-of-the-art performance by a difference of 2.03 R-1, 3.10 R-2, and 2.18 R-L.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

This application is further described with respect to the attached document in Appendix I, entitled "Exploring Neural Models for Query-Focused Summarization," 12 pages, which is considered part of this disclosure and the entirety of which is incorporated by reference.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for query-focused summarization, the method comprising:
   receiving, via a communication interface, a source document, an input query posing a question on a content of the source document and a reference summary of the source document;
   dividing the source document into a plurality of source passages;
   encoding, via an encoder model, a source passage from the plurality of source passages and the input query separated by a delimiter;
   generating, by a final layer of the encoder model, a predicted relevance between the source passage and the reference summary based on the encoding;
   computing a loss function based on the predicted relevance; and
   updating the encoder model based on the computed loss function.

2. The method of claim 1, further comprising:
   receiving a testing query and a testing source document;
   generating, via the encoder model, predicted relevance scores corresponding to parts of the testing source document;
   extracting at least one part of the testing source document relevant to the testing query based on the predicted relevance scores; and
   synthesizes, via an abstractor model, the extracted at least one part into a final summary of the testing source document.

3. The method of claim 1, wherein the loss function is a mean square value of a number of predicted relevances.

4. The method of claim 1, wherein the encoder model is a single-encoder model that jointly encodes the source passage appended with the input query.

5. The method of claim 1, wherein the encoder model is a double-encoder model that separately encodes the input query and the source passage into a query embedding and a passage embedding, respectively.

6. The method of claim 5, wherein the generating the predicted relevance further comprises calculating a cosine similarity between the query embedding and the passage embedding.

7. The method of claim 5, wherein the passage embedding is pre-computed and stored for a given testing query.

8. A system for query-focused summarization, the system comprising:
   a communication interface that receives a source document, an input query posing a question on a content of the source document and a reference summary of the source document;
   a memory storing a plurality of processor-executable instructions; and
   a processor executing the instructions to perform operations comprising:
      dividing the source document into a plurality of source passages;
      encoding, via an encoder model, a source passage from the plurality of source passages and the input query separated by a delimiter;
      generating, by a final layer of the encoder model, a predicted relevance between the source passage and the reference summary based on the encoding;
      computing a loss function based on the predicted relevance; and
      updating the encoder model based on the computed loss function.

9. The system of claim 8, wherein the operations further comprise:
   receiving a testing query and a testing source document;

generating, via the encoder model, predicted relevance scores corresponding to parts of the testing source document;

extracting at least one part of the testing source document relevant to the testing query based on the predicted relevance scores; and synthesizes, via an abstractor model, the extracted at least one part into a final summary of the testing source document.

10. The system of claim 8, wherein the loss function is a mean square value of a number of predicted relevances.

11. The system of claim 8, wherein the encoder model is a single-encoder model that jointly encodes the source passage appended with the input query.

12. The system of claim 8, wherein the encoder model is a double-encoder model that separately encodes the input query and the source passage into a query embedding and a passage embedding, respectively.

13. The system of claim 12, wherein an operation of generating the predicted relevance further comprises calculating a cosine similarity between the query embedding and the passage embedding.

14. The system of claim 13, wherein the passage embedding is pre-computed and stored for a given testing query.

15. A non-transitory computer-readable medium storing a plurality of instructions for query-focused summarization, the instructions executed by one or more processors to perform operations comprising:

receiving, via a communication interface, a source document, an input query posing a question on a content of the source document and a reference summary of the source document;

dividing the source document into a plurality of source passages;

encoding, via an encoder model, a source passage from the plurality of source passages and the input query separated by a delimiter;

generating, by a final layer of the encoder model, a predicted relevance between the source passage and the reference summary based on the encoding;

computing a loss function based on the predicted relevance; and updating the encoder model based on the computed loss function.

16. The non-transitory computer-readable medium of claim 15, wherein the operations further comprise:

receiving a testing query and a testing source document;

generating, via the encoder model, predicted relevance scores corresponding to parts of the testing source document;

extracting at least one part of the testing source document relevant to the testing query based on the predicted relevance scores; and synthesizes, via an abstractor model, the extracted at least one part into a final summary of the testing source document.

17. The non-transitory computer-readable medium of claim 15, wherein the loss function is a mean square value of a number of predicted relevances.

18. The non-transitory computer-readable medium of claim 15, wherein the encoder model is a single-encoder model that jointly encodes the source passage appended with the input query.

19. The non-transitory computer-readable medium of claim 15, wherein the encoder model is a double-encoder model that separately encodes the input query and the source passage into a query embedding and a passage embedding, respectively.

20. The non-transitory computer-readable medium of claim 19, wherein the generating the predicted relevance further comprises calculating a cosine similarity between the query embedding and the passage embedding.

* * * * *